(12) United States Patent
Huang et al.

(10) Patent No.: US 12,104,028 B2
(45) Date of Patent: Oct. 1, 2024

(54) IONIC GEL FILM PREPARATION METHOD, CHEMICAL SENSOR AND PREPARATION METHOD THEREOF

(71) Applicant: Tongji University, Shanghai (CN)

(72) Inventors: Jia Huang, Shanghai (CN); Li Li, Shanghai (CN); Tongrui Sun, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 18/518,473

(22) Filed: Nov. 23, 2023

(65) Prior Publication Data

US 2024/0174826 A1 May 30, 2024

(30) Foreign Application Priority Data

Nov. 24, 2022 (CN) .......................... 202211483899.8

(51) Int. Cl.
*C08J 5/18* (2006.01)
*G01N 27/22* (2006.01)

(52) U.S. Cl.
CPC .............. *C08J 5/18* (2013.01); *G01N 27/226* (2013.01); *C08J 2339/04* (2013.01)

(58) Field of Classification Search
CPC ....... C08J 5/18; C08J 2339/04; G01N 27/226; Y02E 60/10
See application file for complete search history.

(56) References Cited

U.S. PATENT DOCUMENTS

2008/0209876 A1* 9/2008 Miller ............... H01M 10/0565
204/192.12

FOREIGN PATENT DOCUMENTS

| CN | 105590759 A | 5/2016 |
|---|---|---|
| CN | 108630461 A | 10/2018 |

(Continued)

OTHER PUBLICATIONS

Xiaoyu Zhang etc., Title: Bioinspired Gradient Poly(ionic liquid) Ionogels for Ionic Skins with an Ultrawide Pressure Detection Range, published on ACS Materials Lett vol. 4 on May 26, 2023.

(Continued)

*Primary Examiner* — Brian Handville
(74) *Attorney, Agent, or Firm* — Andrew C. Cheng

(57) ABSTRACT

The present disclosure provides an ionic gel film preparation method, a chemical sensor and preparation method thereof, relating to the field of sensor technology. The preparation method of ionic gel film includes: blending a vinyl-free ionic liquid with a vinyl-containing ionic liquid and a specified additive to obtain a homogenous solution, taking a predetermined amount of the homogenous solution and dropping it onto a first substrate equipped with interdigital electrodes, flattening the homogenous solution on the first substrate using a second substrate, curing the flattened homogenous solution on the first substrate using ultraviolet light of a preset wavelength, and curing until the vinyl-containing ionic liquid polymerizes in situ to form an ionic gel film. The preparation method of ionic gel film, chemical sensor, and preparation method thereof of the present disclosure have the advantages of good device consistency, high conductivity, and good sensing performance when using the ionic gel film.

16 Claims, 9 Drawing Sheets

(56) References Cited

FOREIGN PATENT DOCUMENTS

| CN | 112185712 A | 1/2021 |
|----|-------------|--------|
| CN | 114409849 A | 4/2022 |

OTHER PUBLICATIONS

Search report of CN patent application No. 2022114838998 issued on May 29, 2023.
"Applications and Research of Ionic Liquids" by Ya Zhang, on p. 45, Shaanxi Science and Technology Publishing House, 1st Edition, Oct. 2009.
"Handbook of Synthetic Polymers and Plastics Analysis" by J. Urbaniski et al., translated by Benming Chen, pp. 65-66, Chemical Industry Press, Jun. 1982, 1st edition.
Ming Liang Jin etc, title "An Ultrastable Ionic Chemiresistor Skin with an Intrinsically Stretchable Polymer Electrolyte", published by Wiley in Daejeon, South Korea on Mar. 30, 2018.
Shuangfei Xiang etc, title "Self-Healable, Recyclable, and Ultrastrong Adhesive Ionogel forMultifunctional Strain Sensor", published by American Chemical Society in Shanghai, China on Apr. 26, 2021.
Jianfei Tie etc, title "Conductive ionogel with underwater adhesion and stability as multimodal sensor for contactless signal propagation and wearable devices" published by Elsevier in Shanghai, China on Jan. 4, 2022.

\* cited by examiner ly small-volume inorganic or organic anions and relatively large-volume organic cations, and become liquid at or near room temperature. Owing to the exceptional physicochemical properties of ionic liquids, such as their excellent thermal stability, low volatility, high ionic conductivity, and stable electrochemical window, they have received widespread attention over the past several decades. Additionally, the chemical composition, structure, and properties of ionic liquids are diverse. Researchers can achieve various research objectives by adjusting the cations and anions within these liquids. As a result, in recent years, ionic liquids have been broadly utilized for diverse purposes, including as functional solvents, lubricants, gas separators, and electrolytes.

IONIC GEL FILM PREPARATION METHOD, CHEMICAL SENSOR AND PREPARATION METHOD THEREOF

TECHNICAL FIELD

The present disclosure relates to the technical field of sensor, and in particular to an ionic gel film preparation method, a chemical sensor and a preparation method thereof.

BACKGROUND

In the prior art, ionic liquids (ILs) are a class of molten salts composed entirely of ions, usually composed of relatively small-volume inorganic or organic anions and relatively large-volume organic cations, and become liquid at or near room temperature. Owing to the exceptional physicochemical properties of ionic liquids, such as their excellent thermal stability, low volatility, high ionic conductivity, and stable electrochemical window, they have received widespread attention over the past several decades. Additionally, the chemical composition, structure, and properties of ionic liquids are diverse. Researchers can achieve various research objectives by adjusting the cations and anions within these liquids. As a result, in recent years, ionic liquids have been broadly utilized for diverse purposes, including as functional solvents, lubricants, gas separators, and electrolytes.

However, due to the fluidity of ionic liquids at ambient temperature, their applications in many fields are considerably limited. Therefore, it is particularly crucial to restrict the fluidity of ionic liquids by combining them with specific substrates. Against this backdrop, many studies have integrated ionic liquids with traditional polymer substrates (such as PEG, PU, etc.) to prepare ionic gels. Yet, the associated preparation processes often suffer from being time-consuming and having intricate procedures. For instance, to introduce ionic liquids into TPU (thermoplastic polyurethane), one first needs to stir TPU in DMF (dimethylformamide) at 60° C. for about 3 hours. Subsequently, the ionic liquid is added to the solution and stirring continues. Finally, the mixture is cured at 120° C. for approximately 24 hours to remove any excess solvent. Such a tedious and time-consuming preparation process poses significant hindrances to the commercialization and industrial application of ionic gels.

In the prior art, poly(ionic liquid)s (PILs) are a class of polymers typically formed by polymerizing ionic liquid monomers containing vinyl groups as repeating units through double bond reactions. Ionic liquids with vinyl groups can be easily converted into ionic gels of poly(ionic liquid) through bulk polymerization of the ionic liquid. However, compared to the ionic liquid monomers, the ionic conductivity of poly(ionic liquid)s often experiences a decline by orders of magnitude. For instance, a typical ionic liquid with a vinyl group, namely 1-vinyl-3-ethylimidazolium bis(trifluoromethylsulfonyl)imide, sees its ionic conductivity decrease from $1*10^{-2}$ S/cm to $1*10^{-6}$ S/cm after polymerizing into a poly(ionic liquid). Ionic conductivity is a fundamental characteristic of ionic gels. The significant decrease in the ionic conductivity of poly(ionic liquid)s hinders their broader and deeper applications in various fields.

Therefore, the ionic gels of poly(ionic liquid)s in the current technology are limited in their applications due to the substantial decline in ionic conductivity, necessitating further improvements in this area.

SUMMARY

The present disclosure provides a preparation method of ionic gel film, a chemical sensor and preparation method thereof, aiming to address the technical issue of the significant decline in conductivity of ionic gel films in the prior art, and applies the ionic gel film to chemical sensing.

In a first aspect, the present disclosure provides a preparation method of ionic gel film, wherein the ionic gel comprises a poly(ionic liquid) and a vinyl-free ionic liquid monomer, the ionic gel is formed by compounding the vinyl-free ionic liquid monomer with the poly(ionic liquid), the poly(ionic liquid) is formed through the polymerization of ionic liquid monomers containing C=C double bonds to form a skeleton, while the vinyl-free ionic liquid monomer exists as free-state small molecules within the poly(ionic liquid), the preparation method comprises:

blending a vinyl-free ionic liquid with a vinyl-containing ionic liquid and a specified additive to obtain a homogenous solution, wherein the concentration of the vinyl-free ionic liquid is less than or equal to the concentration of the vinyl-containing ionic liquid, the additive is at least one of photoinitiators, crosslinkers, and plasticizers;

taking a predetermined amount of the homogenous solution and dropping it onto a first substrate equipped with interdigital electrodes, flattening the homogenous solution on the first substrate using a second substrate, curing the flattened homogenous solution on the first substrate using ultraviolet light of a preset wavelength, and, curing until the vinyl-containing ionic liquid polymerizes in situ to form an ionic gel film.

As a preferred embodiment of the present disclosure, the preparation method further comprises:

evaluating the electrical conductivity of the ionic gel film.

As a preferred embodiment of the present disclosure, the preset wavelength of the ultraviolet light ranges from 10 nm to 400 nm.

As a preferred embodiment of the present disclosure, the second substrate is a transparent substrate.

As a preferred embodiment of the present disclosure, an anion of the vinyl-free ionic liquid is one of tetrafluoroborate, hexafluorophosphate, bis(trifluoromethane)sulfonimide, and halide ions.

As a preferred embodiment of the present disclosure, the poly(ionic liquid) is obtained by polymerizing a vinyl-containing imidazole-based ionic liquid monomer.

As a preferred embodiment of the present disclosure, a substituent on the imidazole ring of the vinyl-containing imidazole-based ionic liquid monomer is an alkyl substituent.

As a preferred embodiment of the present disclosure, the vinyl-containing imidazole-based ionic liquid monomer is selected from at least one of 1-vinyl-3-methylimidazolium chloride, 1-vinyl-3-butylimidazolium tetrafluoroborate, 1-vinyl-3-methylimidazolium hexafluorophosphate, 1-vinyl-3-benzylimidazolium methanesulfonate, 1-allyl-3-methylimidazolium chloride, 1-allyl-3-methylimidazolium tosylate, and 1-allyl-3-butylimidazolium hexafluorophosphate.

As a preferred embodiment of the present disclosure, curing time of the ultraviolet light during ionic gel film formation ranges from 1 sec to 30 min.

As a preferred embodiment of the present disclosure, the thickness of the ionic gel film ranges from 10 nm to 500 sm.

In a second aspect, the preparation method of chemical sensor, wherein the preparation method of chemical sensor comprises:

preparing an ionic gel film according to the preparation method of ionic gel film according to the first aspect, and, depositing the ionic gel film on an interdigital electrode of a first substrate for a preset duration to obtain a chemical sensor.

As a preferred embodiment of the present disclosure, the preparation method of chemical sensor further comprises:

performing a capacitance test on the prepared chemical sensor to evaluate the consistency of the chemical sensor.

As a preferred embodiment of the present disclosure, the preparation method of the chemical sensor further comprises:

testing a capacitance change characteristic and recoverability of the ionic gel film to DMC.

As a preferred embodiment of the present disclosure, the present duration is based on the mass ratio of the specified additive to the vinyl-containing ionic liquid.

As a preferred embodiment of the present disclosure, the preparation method of chemical sensor further comprises.

performing humidity compensation on the chemical sensor to enhance sensing performance thereof.

As a preferred embodiment of the present disclosure, the step of performing humidity compensation on the chemical sensor to enhance sensing performance thereof comprises:

acquiring capacitance characteristic changes of the chemical sensor to obtain a real value of capacitance of the chemical sensor during the process of detecting a target gas, recording humidity changes during the target gas detection process using a humidity sensor, and calculating to obtain a calculated value of capacitance of the chemical sensor during this process using a capacitance-humidity formula, comparing the real value with the calculated value to achieve quantitative analysis of DMC.

In a third aspect, the present disclosure provides A chemical sensor, wherein it comprises:

a first substrate, equipped with an interdigital electrode;

an ionic gel film, deposited on the interdigital electrode of the first substrate, wherein the chemical sensor is prepared using the preparation method of chemical sensor according to the third aspect.

As a preferred embodiment of the present disclosure, the chemical sensor is used for monitoring leakage of electrolytes in lithium-ion batteries.

As a preferred embodiment of the present disclosure, an output signal form of the chemical sensor includes capacitance, resistance, impedance and current.

As a preferred embodiment of the present disclosure, the chemical sensor exhibits a sensitive response to main solvent of lithium-ion battery electrolytes, the main solvent comprises ester solvent and ether solvent.

Beneficial effects: The ionic gel film of the present disclosure is anew polymer material. Not only can it maintain the high ionic conductivity characteristic of ionic liquids, but by confining the ionic liquid within the poly(ionic liquid) matrix, it can also overcome the drawback of ionic liquids being prone to flow at ambient temperatures.

The preparation method of the ionic gel film proposed in the present disclosure involves taking a predetermined amount of the homogeneous solution and dropping it onto a first substrate; using a second substrate to flatten the homogeneous solution on the first substrate; curing with ultraviolet light of a preset wavelength on the flattened homogeneous solution on the first substrate; curing until the vinyl-containing ionic liquid undergoes in-situ polymerization to form an ionic gel; removing the second substrate after curing by ultraviolet light, so as to obtain an ionic gel film on the first substrate. This preparation method is characterized by its simplicity, short processing time, and other advantages, making it suitable for large-scale industrial production. Moreover, this method can also ensure the consistency of the thickness of the ionic gel film. Most ionic gel films are usually prepared using the drop-casting method or the templating method. However, it's often challenging to produce devices with consistent ionic gel films using the above two methods, limiting their commercial applications. Therefore, devices made using this ionic gel as a functional material have very consistent film thickness.

The ionic gel film prepared by the preparation method described in the present disclosure has a wide range of application scenarios in various fields. For example, in chemical sensing, metal oxide semiconductor sensors, which are the most widely used, rely on electrons or holes as carriers. As a result, their sensing mechanism is singular, and their detection range is somewhat limited, making it difficult to detect low-polarity, redox-neutral substances. By using the ionic gel composed of a composite ionic liquid and a poly(ionic liquid) as the sensing material, organic ions serve as the carriers. These carriers are diverse and tunable, leading to not only rapid response times but also enhanced selectivity towards target analytes by selecting specific organic ions. In the present disclosure, such an ionic gel, made from a combination of ionic liquid and poly(ionic liquid), is used as the sensing material to fabricate chemical sensors for monitoring trace electrolyte leakage. The device demonstrates excellent sensitivity, rapid response time, and outstanding consistency. Thus, chemical sensors based on this type of ionic gel hold significant commercial potential.

BRIEF DESCRIPTION OF THE DRAWINGS

To clarify the technical solutions of the embodiments in the present disclosure, the accompanying drawings used in the embodiments will be briefly introduced. For those skilled in the art, based on these drawings and without exerting inventive effort, other drawings can be obtained. All of these are within the scope of protection of the present disclosure.

DETAILED DESCRIPTION

Figure 1:
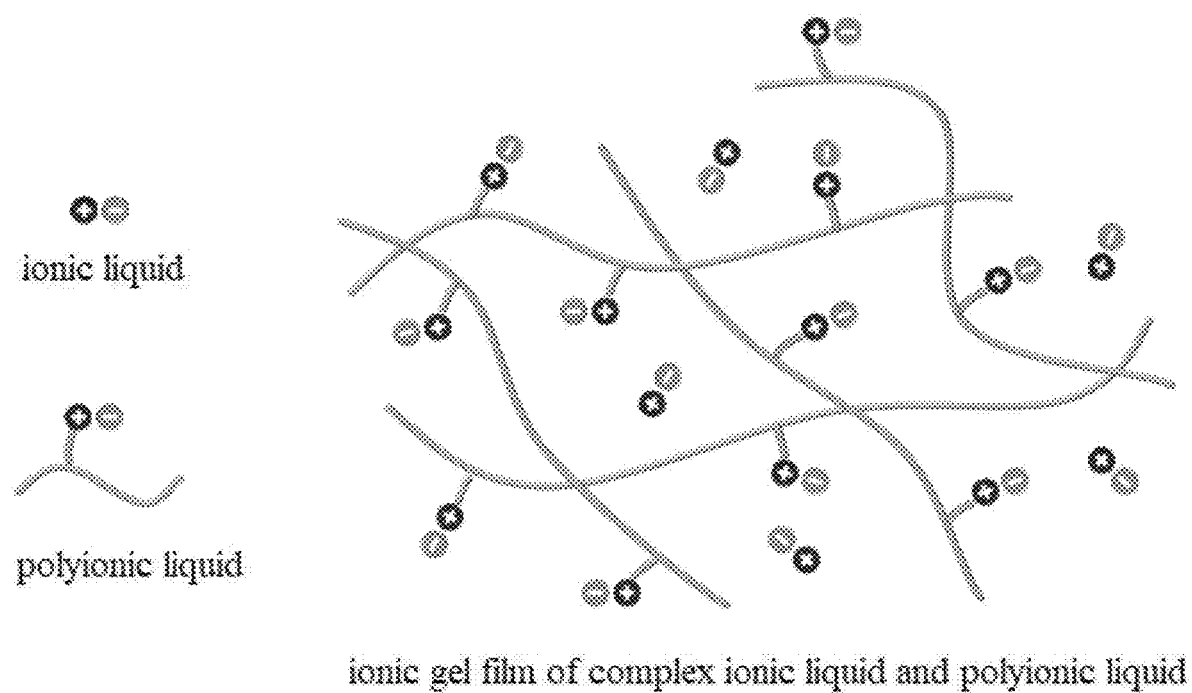
FIG. 1 is a schematic diagram of the ionic gel composed of a composite ionic liquid and a poly(ionic liquid) in Embodiment 1 of the present disclosure.

In order to make the objectives, technical solutions, and advantages of the embodiments of the present disclosure clearer, the technical solutions in the embodiments of the present disclosure will be clearly and completely described below with reference to the accompanying drawings in the embodiments of the present disclosure. It should be noted that in this context, relational terms such as "first" and "second," etc., are used solely to distinguish one entity or operation from another, without necessarily requiring or implying any actual such relationship or order between them. In the description of the present disclosure, it should be understood that terms such as "center," "up," "down," "front," "back," "left," "right," "vertical," "horizontal," "top," "bottom," "inner," "outer," etc., indicate the direction or positional relationship based on the orientations or positional relationships shown in the drawings. They are only for the purpose of facilitating the description of the present application and simplifying the description, and do not indicate or imply that the referred device or component must have a specific orientation, be constructed and operated in a specific orientation, and therefore should not be construed as limiting the present application. Moreover, the terms "include," "comprise," or any other variation thereof, are intended to cover a non-exclusive inclusion, so that a process, method, article, or apparatus that includes a series of elements not only includes those elements but also includes other elements not explicitly listed or inherent to such a process, method, article, or apparatus. Without further limitation, an element defined by the statement "comprising . . . " does not exclude the presence of other identical elements in a process, method, article, or apparatus that comprises the said element. If not in conflict, the features in the embodiments and examples of the present application can be combined with each other, all within the scope of protection of the present application.

Embodiment 1

Referring to FIG. 1, in the Embodiment 1 of the present disclosure, anionic gel is provided. The ionic gel comprises a poly(ionic liquid) and a vinyl-free ionic liquid monomer. The ionic gel is obtained by compounding the vinyl-free ionic liquid monomer with the said poly(ionic liquid). Herein, the poly(ionic liquid) is formed by polymerizing the ionic liquid monomer that contains C=C double bonds (vinyl groups), establishing a skeleton, while the vinyl-free ionic liquid monomer exists in a free state within the poly(ionic liquid).

In this present disclosure, the monomer of the poly(ionic liquid), which contains C=C double bonds, forms the poly(ionic liquid) after photo-curing. The doped ionic liquid, devoid of C=C double bonds, remains in the form of small molecules within the poly(ionic liquid) even after photo-curing. Moreover, these two ionic liquids may not belong to the same series, but it is essential that they are miscible with each other, forming a homogeneous system. Namely, the ionic liquid with C=C double bond and the ionic liquid without C=C double bonds are mixed together to form a homogeneous system. Under photo-curing, the ionic liquid containing the C=C double bonds polymerizes to form the poly(ionic liquid), serving as the skeleton. The ionic liquid without C=C double bonds is still doped in its form of small molecules, playing a role in enhancing ionic conductivity.

As a preferred embodiment of the present disclosure, the poly(ionic liquid) is obtained by polymerizing a vinyl-containing imidazole-based ionic liquid monomer.

As a preferred embodiment of the present disclosure, a substituent on an imidazole ring of the vinyl-containing imidazole-based ionic liquid monomer is an alkyl substituent.

As a preferred embodiment of the present disclosure, the vinyl-containing imidazole-based ionic liquid monomer is selected from at least one of 1-vinyl-3-methylimidazolium chloride, 1-vinyl-3-butylimidazolium tetrafluoroborate, 1-vinyl-3-methylimidazolium hexafluorophosphate, 1-vinyl-3-benzylimidazolium methanesulfonate, 1-allyl-3-methylimidazolium chloride, 1-allyl-3-methylimidazolium tosylate, and 1-allyl-3-butylimidazolium hexafluorophosphate.

As a preferred embodiment of the present disclosure, an anion of the vinyl-free ionic liquid is one of tetrafluoroborate, hexafluorophosphate, bis(trifluoromethane)sulfonimide, and halide ions.

Figure 2:
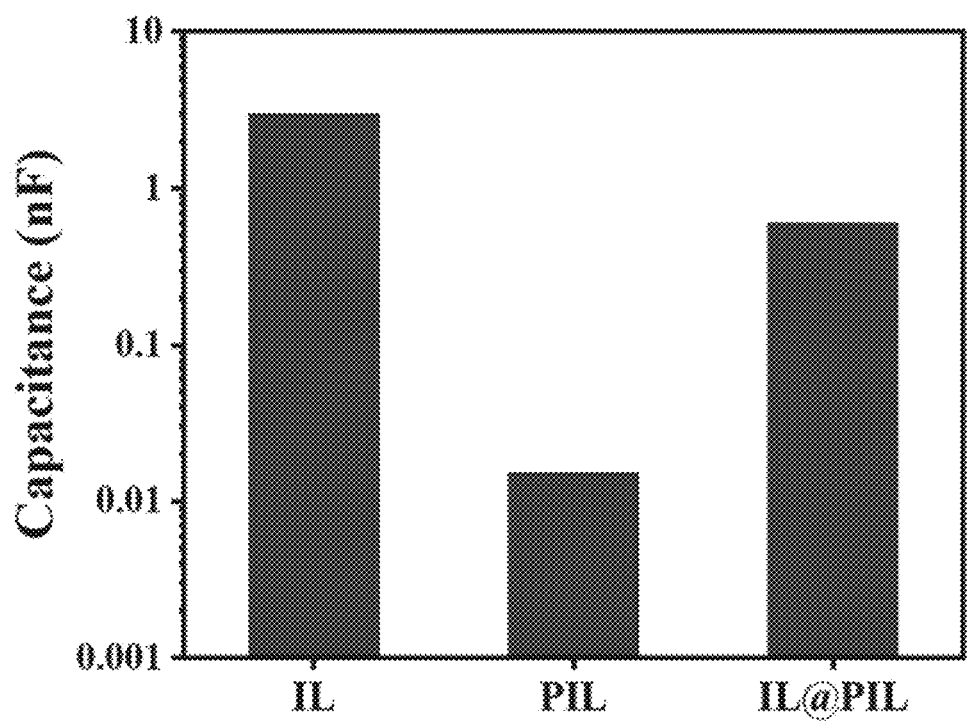
FIG. 2 is an evaluation of the ionic conductivity of three materials in this application: ionic liquid (IL), poly(ionic liquid) (PIL), and a composite of ionic liquid and poly(ionic liquid) gel (IL@PIL).

Referring to FIG. 2, the present disclosure experimentally verifies the conductivity of the ionic gel (IL@PIL). (Detailed experimental explanations can be found in Example 2 of Embodiment 3. Here, only the conductivity of the ionic gel is described based on experimental results.) By comparing the properties of ionic liquid (IL), poly(ionic liquid) (PIL), and ionic gel (IL@PIL), it can be observed that the ionic liquid exhibits good conductivity. However, due to its ionic state, its mechanical stability is very poor. On the other hand, the poly(ionic liquid) has very poor conductivity, almost non-conductive. The conductivity of the ionic gel is close to that of the ionic liquid, yet it maintains excellent stability, good stretchability, flexibility, and resistance to bending.

The ionic gel of the present disclosure represents a novel polymeric material. Not only does it retain the high ionic conductivity characteristic of ionic liquids, but by confining the ionic liquid within the poly(ionic liquid) matrix, it also overcomes the drawback of ionic liquids being prone to flow at ambient temperatures.

It should be noted that the present disclosure does not provide explicit limitations on the ratio of the poly(ionic liquid) to the ionic liquid monomer without vinyl groups. The poly(ionic liquid) can be formed at room temperature through photo-curing, which is a known technique and, therefore, the polymerization reaction of the poly(ionic liquid) is not further detailed here. In this present disclosure, the chain length (skeletal structure) of the poly(ionic liquid)

is controlled by the duration of photocuring and the concentration of the ionic liquid monomer containing C=C double bonds of the poly(ionic liquid).

Embodiment 2

In Embodiment 2 of the present disclosure, a new preparation method for the ionic gel described in Embodiment 1 is provided, which includes:

By adding a vinyl-containing ionic liquid to a vinyl-free ionic liquid, the vinyl-free ionic liquid exists in a free state within the skeleton formed by the polymerization of the vinyl-containing ionic liquid. Therefore, in the fabrication of ionic gel films, to ensure the quality of film formation, the concentration of the vinyl-free ionic liquid should be less than or equal to the concentration of the vinyl-containing ionic liquid. Of course, the higher the concentration of the vinyl-free ionic liquid, the better the conductivity. To ensure both the conductivity and the quality of film formation of the ionic gel film, the concentration of the vinyl-free ionic liquid should be close to that of the vinyl-containing ionic liquid.

Stirring to form a homogeneous solution after adding an additive, a homogeneous solution is obtained. The additive here includes at least one of the photoinitiators, crosslinkers, and plasticizers. Typically, the mass ratio of additive to vinyl-containing ionic liquid is in the range of 1/1000 to 20/1000. A ratio exceeding 20/1000 will lead to increased production costs, and if the ratio is too low, it will affect the polymerization reaction.

Controlling ultraviolet light to irradiate and cure the homogenous solution. As a preferred embodiment of the present disclosure, the wavelength range of the preset ultraviolet light is from 10 nm to 400 nm. 365 nm is commonly used, and this wavelength range is more commonly used in the industry. The present disclosure does not specify the selection of the ultraviolet light wavelength range. The reaction temperature can be at room temperature, and the reaction duration can be adjusted appropriately based on the mass ratio of the additive to the ionic liquid containing the vinyl group.

Curing for a predetermined time until the vinyl-containing ionic liquid polymerizes to form a poly(ionic liquid), whereas the vinyl-free ionic liquid does not polymerize and is evenly dispersed in the poly(ionic liquid) skeleton.

The preparation method of the ionic gel proposed in the present disclosure involves adding a vinyl-containing ionic liquid to a vinyl-free ionic liquid. After adding a photoinitiator and stirring, a homogeneous solution system is formed. Upon exposure to ultraviolet light, the vinyl-containing ionic liquid polymerizes to form a poly(ionic liquid). Meanwhile, the vinyl-free ionic liquid remains unpolymerized and is evenly dispersed within the skeleton of the poly(ionic liquid). In this manner, the ionic gel obtained by in situ polymerization effectively restricts the fluidity of the ionic liquid while maintaining high ionic conductivity, showcasing its potential for a broad range of applications.

Embodiment 3

Figure 3:
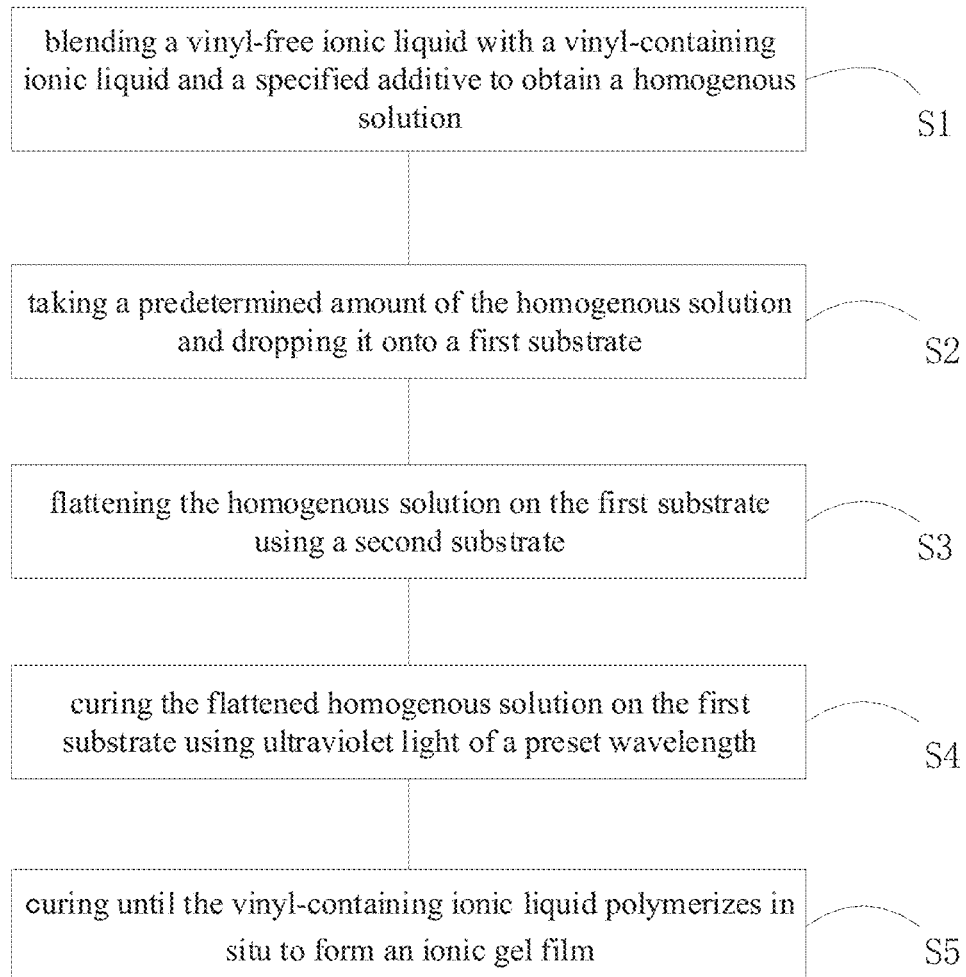
FIG. 3 is a process flow diagram for the preparation method of the ionic gel film in Embodiment 3 of the present disclosure.

Referring to FIG. 3, in Embodiment 3 of the present disclosure, based on the ionic gel of Embodiment 1 and the preparation method of the ionic gel of Embodiment 2, a preparation method of an ionic gel film is also proposed. The preparation method includes the following steps of:

Step S1 of blending a vinyl-free ionic liquid with a vinyl-containing ionic liquid and a specified additive to form a homogenous solution to obtain a homogenous solution. As a preferred embodiment of the present disclosure, the specified additives include at least one of a photoinitiator, crosslinker, and plasticizer, but are not limited to these. The specific mass proportions and descriptions can be referred to in Embodiment 2.

Step S2 of taking a predetermined amount of the homogenous solution and dropping it onto a first substrate. The volume of taken solution ranges from 100 $\mu L/m^2$ to 10 $L/m^2$.

Step S3 of flattening the homogenous solution on the first substrate using a second substrate. Both the first and the second substrates are preferably transparent, such as glass or transparent plastic. In one specific embodiment, the second substrate is a transparent substrate such that ultraviolet light is transmitted through the second substrate to cure the flattened homogeneous solution on the first substrate, while the first substrate may not be a transparent substrate.

Step S4 of curing the flattened homogenous solution on the first substrate using ultraviolet light of a preset wavelength. As a preferred embodiment of the present disclosure, the preset wavelength of the ultraviolet light ranges from 10 nm to 400 nm, with a more preferred range being the commonly used 365 nm to 395 nm in the industry.

Step S5 of curing until the vinyl-containing ionic liquid polymerizes in situ to form an ionic gel film.

In step S5, curing time of the ultraviolet light during ionic gel film formation ranges from 1 sec to 30 min, the curing time can control the conductivity of the film, if the curing time is too long, it will reduce the film's conductivity, while a curing time that is too short may affect the film formation.

As a preferred embodiment of the present disclosure, the preparation method adopts at least one of the templating method, spin-coating method, blade-coating method, and film pressing method.

Preferably, the mass ratio of the vinyl-containing ionic liquid to the vinyl-free ionic liquid in the present disclosure is from 0 to 1/100.

Preferably, the mass ratio of the additive to the ionic liquid containing a vinyl group in this application is from 1/1000 to 20/1000. Here, a photoinitiator is preferably used.

The volume of the mixed solution dropped onto the substrate in this application ranges from 100 $\mu L/m^2$ to 10 $L/m^2$. The usually preferred range is from 200 $L/m^2$ to 1000 $\mu L/m^2$. In this way, the obtained film has better thickness and stability.

Below, the preparation method of the poly(ionic liquid) film will be described in combination with specific examples.

Example 1

In this example, the vinyl-free ionic liquid is 1-ethyl-3-methylimidazolium bis(trifluoromethanesulfonyl)imide, and the vinyl-containing ionic liquid is 1-vinyl-3-butylimidazolium bis(trifluoromethanesulfonyl)imide. The photoinitiator used is Irgacure-2959. The preparation method of the composite ionic liquid and poly(ionic liquid) gel in this example includes the following steps:

Step S11 of mixing 1-butyl-3-vinylimidazolium bis(trifluoromethanesulfonyl)imide and the photoinitiator Irgacure-2959 at a mass ratio of 500:1, and stirring until a uniform solution is obtained;

Step 12 of mixing the above solution with 1-ethyl-3-methylimidazolium bis(trifluoromethanesulfonyl)imide at a mass ratio of 1:1, and stirring until a uniform solution is obtained;

Step 13 of using a micro-syringe to take 0.1 μL of the above ionic liquid solution and applying it to a substrate of 1 cm²;

Step 14 of placing a PET film over the ionic liquid, ensuring it spreads out completely;

Step 15 of using a ultraviolet lamp with a wavelength of 365 nm for photo-curing;

Step 16 of removing the PET film to reveal a ionic gel film of composite ionic liquid and poly(ionic liquid).

FIG. 1 shows a schematic diagram of the ionic gel film of composite ionic liquid and poly(ionic liquid) prepared using the above method (the distribution within the film is consistent with the ionic gel).

Example 2

Based on Example 1, Example 2 evaluates the ion conductivity of three materials: ionic liquids, poly(ionic liquid)s, and ionic gels of composite ionic liquids and poly(ionic liquid)s; in this example, devices based on ionic liquid (IL), poly(ionic liquid) (PIL), and ionic gel film of composite ionic liquid and poly(ionic liquid) (IL@PIL) are provided, the above-mentioned film preparation method of the present disclosure further includes a step of evaluating the conductivity of the ionic gel film, and the evaluation step includes the following steps:

Step 21 of using a micro-syringe to take 1 μL of 1-propyl-3-methylimidazolium chloride and applying it to a substrate of 1 cm², placing a PET film over the ionic liquid, ensuring it spreads out completely to obtain a device based on IL (vinyl-free ionic liquid as referred to in the present disclosure);

Step 22 of taking 1 μL of 1-vinylpropyl-3-methylimidazolium chloride containing the photoinitiator with a micro-syringe and applying it to a substrate of 1 cm², then placing a PET film over the ionic liquid, ensuring it spreads out completely, using a ultraviolet lamp with a wavelength of 365 nm for curing, producing a device based on PIL (poly(ionic liquid) as referred to in the present disclosure);

Step 23 of taking 1 μL of a mixture of 1-vinylpropyl-3-methylimidazolium chloride and 1-vinylpropyl-3-methylimidazolium chloride containing the photoinitiator with a micro-syringe and applying this mixture to a substrate of 1 cm², placing a PET film over the ionic liquid, ensuring it spreads out completely, using a ultraviolet lamp with a wavelength of 365 nm for curing, so as to obtain a device based on IL@PIL (ionic gel film as referred to in the present disclosure).

The three devices obtained are connected to the TH2827C type LCR meter to test their capacitance values. Under alternating current voltage, the cations and anions in the device migrate back and forth between the electrodes, forming an electric double layer, thereby obtaining a stable capacitance value. The larger the capacitance value of the device, the higher the ionic conductivity of its material, making it more advantageous for applications in fields such as sensors.

Through the aforementioned evaluation step, the present disclosure can set the proportion of the vinyl-free ionic liquid in the ionic gel film sensor according to the requirements when the sensor is used to detect the concentration of a main component, DMC (dimethyl carbonate), in the battery electrolyte.

Referring to FIG. 2, FIG. 2 compares the capacitance values of devices obtained based on three materials of ionic liquid (IL), poly(ionic liquid) (PIL), ionic gel of a composite ionic liquid and poly(ionic liquid) (IL@PIL). Compared to the ionic liquid monomer, the capacitance value of the poly(ionic liquid) has dropped significantly, indicating that there is an order of magnitude difference in their ionic conductivity. On the other hand, the capacitance value of the ionic gel composed of a composite ionic liquid and poly(ionic liquid) has significantly increased compared to the poly(ionic liquid), and it is comparable to the ionic liquid monomer. Therefore, the ionic gel of the composite ionic liquid and poly(ionic liquid) according to this present disclosure not only can restrict the flowability of the ionic liquid but also retains a high ionic conductivity. As a result, it has a broad application prospect in various fields.

Example 3

The Example 3 evaluates the consistency of the ionic gel film obtained from Example 1. This example involves the preparation of a sensor based on the ionic gel film from the composite ionic liquid and poly(ionic liquid), which includes the following steps:

Step 31 of mixing 1-vinyl-3-butylimidazolium tetrafluoroborate and the photoinitiator Irgacure-2959 in a mass ratio of 100:1, and stirring to obtain a homogeneous solution;

Step 32 of mixing the above solution with 1-butyl-3-methylimidazolium tetrafluoroborate in a volume ratio of 4:1, and stirring to form a uniform solution;

Step 33 of using a pipette to dispense 1 mL of the aforementioned ionic liquid solution onto a PCB substrate of 20 cm², which has a printed 4*4 interdigital electrode array;

Step 34 of covering the ionic liquid on the PCB substrate completely with a PET film;

Step 35 of curing with a ultraviolet lamp with a wavelength of 365 nm;

Step 36: peeling off the PET film to obtain 16 sensors based on the ionic gel film prepared under the same conditions.

Preferably, the thickness of the ionic gel film ranges from 10 nm to 500 μm, if the film is too thick, it will affect the sensitivity of the chemical sensor, leading to prolonged detection times, while a film that is too thin may affect the quality of film formation.

Figure 4:
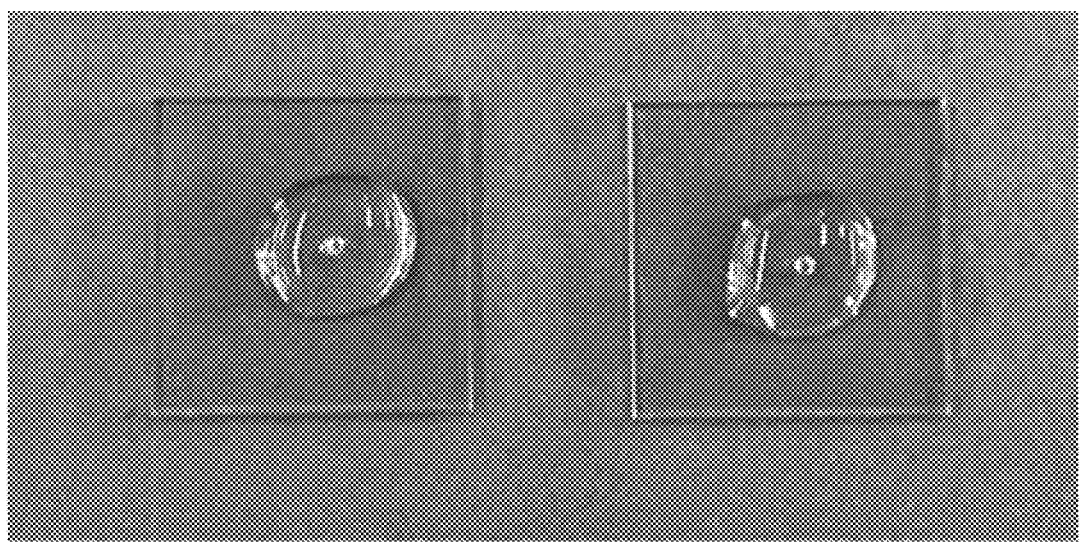
FIG. 4 is a diagram of dispensing 50 μL of the solution onto two glass substrates in the third embodiment of the present disclosure.

Ultraviolet light possesses high energy. When the photoinitiator in the solution absorbs this energy, it undergoes photolysis to form free radicals. These free radicals then induce the unsaturated bonds in the ionic liquid with vinyl groups to generate their own free radicals, initiating a radical chain reaction resulting in the formation of poly(ionic liquid)s. The vinyl-free ionic liquids do not participate in the reaction but instead disperse evenly throughout the poly (ionic liquid). As a result, an ionic gel composed of the composite ionic liquid and the poly(ionic liquid) is formed. In a specific example, the ionic gel film device is prepared by spinning coating and pressing film respectively, the steps are as follows:

Step 1 of mixing 1-vinyl-3-butylimidazolium tetrafluoroborate (vinyl-containing ionic liquid) and 1-butyl-3-methylimidazolium tetrafluoroborate (vinyl-free ionic liquid) at a volume ratio of 4:1, then, adding 1% wt of photoinitiator Irgacure-2959 and stirring for 3-12 hours to form a homogeneous solution system. As shown in FIG. 4, dispensing 50 μL of the aforementioned solution onto two glass substrates that have been pre-treated with plasma.

Figure 5A:
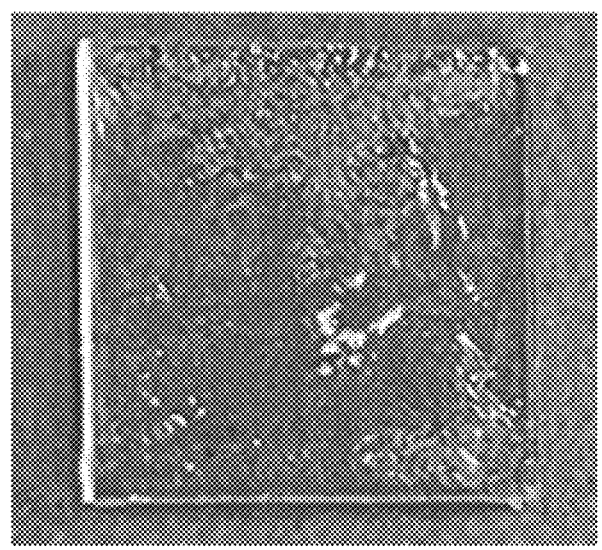
FIG. 5a is a diagram of the ionic gel film device A obtained by spin coating method in the third embodiment of the present disclosure.

Step 2 of for one of the substrates, preparing the ionic gel film using a spin coating method, the specific process is as follows: controlling the spin-coater to rotate at 1000 rpm for 1 min, then, curing under a 365 nm ultraviolet lamp for 5 minutes to obtaining the ionic gel film as shown in FIG. 5*a*.

Step 3 of for the other substrate, preparing the ionic gel film using the film pressing method. The specific process is as follows: pressing a PET film onto the surface of the solution, ensuring it uniformly covers the entire glass substrate (this process takes from several seconds to several minutes), and then curing it under an ultraviolet lamp with a wavelength of 365 nm for 5 minutes to obtain the ionic gel film as shown in FIG. 5*b*.

Figure 5B:
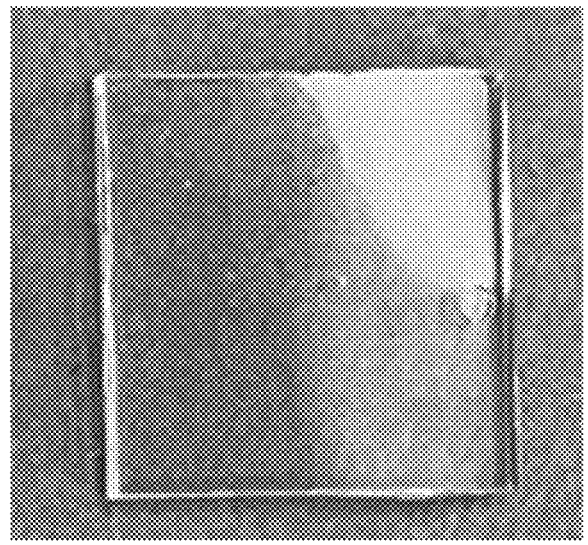
FIG. 5b is a diagram of the ionic gel film device B obtained by film pressing method in the third embodiment of the present disclosure.

By comparing the two prepared film devices A and B respectively shown in FIG. 5*a* and FIG. 5*b*, it can be observed that the ionic gel film B produced using the film pressing method has a smooth surface, better curing, and uniform thickness. In contrast, the ionic gel film A produced using the spin coating method presents a rough surface and incomplete curing. This can be attributed to the fact that phase separation occurs during the spin coating process, preventing optimal photocuring effect. However, the film pressing method consistently maintains an even mixture of all components in the solution, ensuring that each part is properly cured. Therefore, for the ionic gel material system, the ionic gel film device B obtained using the film pressing method demonstrates superior performance.

Figure 7A:
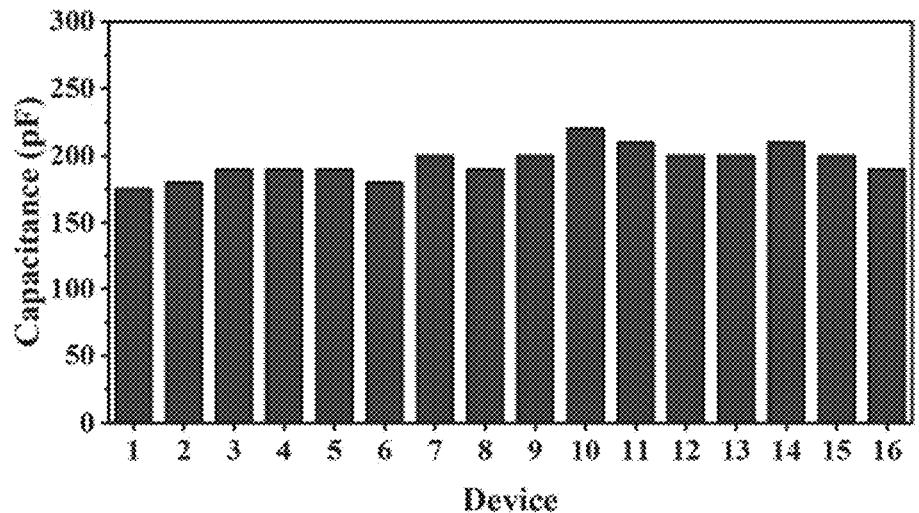
FIG. 7a is an evaluation of the consistency of the ionic gel film devices prepared using the technology described in the third embodiment of the present disclosure.

The capacitance of 16 sensors is measured by LCR meter and compared. FIG. 7*a* evaluates the consistency of the 16 ionic gel film chemical sensors prepared using this technology. As can be seen from FIG. 7*a*, under the same environment and the same test conditions, the capacitance of the 16 sensors based on the ionic gel film is basically around 200 pF, demonstrating good consistency between devices. Therefore, the ionic gel film sensors prepared using this method have superior consistency between batches, facilitating large-scale industrial production.

Figure 6:
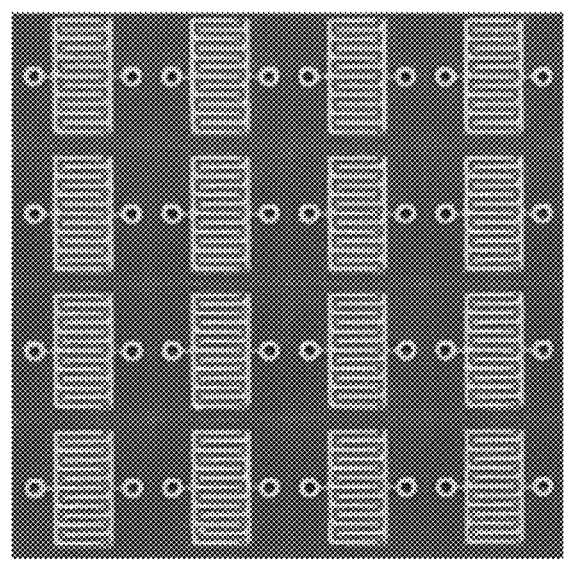
FIG. 6 is a diagram of 4*4 interdigital electrode array printed on PCB as control group in the third embodiment of the present disclosure.
Figure 7B:
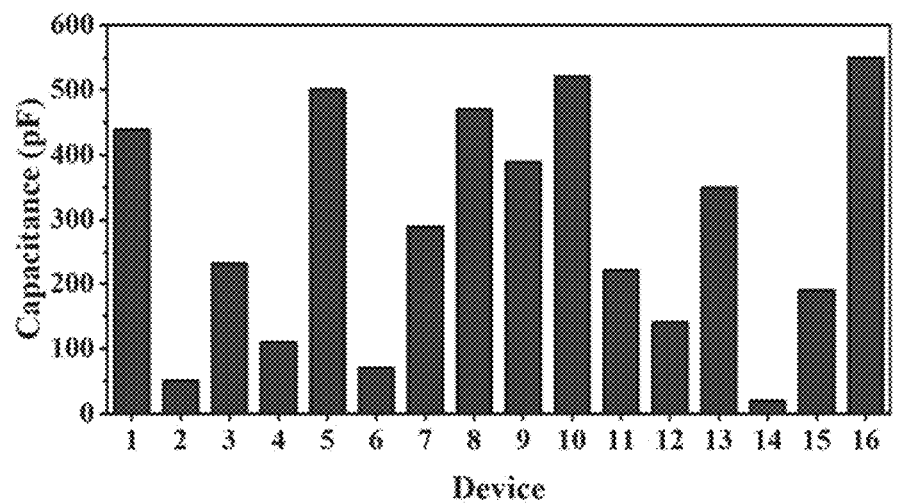
FIG. 7b is a consistency evaluation of ionic gel film devices prepared by spin coating method as control group in the third embodiment of the present disclosure.

A control experiment for consistency evaluation of ionic gel film devices prepared by spin coating is performed, using the same experimental means as described above, the consistency evaluation is preformed on the ionic gel film device prepared by the spin coating method. The evaluation results are as follows:

Comparing the results of the control group in the aforementioned FIG. 6 and FIG. 7*b* with the film pressing method used in this present disclosure, there are clear differences in the consistency of the ionic gel film devices prepared by the two methods. The consistency of the ionic gel film device prepared by the spin coating method is very poor (after capacitance normalization, there is a significant numerical difference, the values of No. 2 and No. 14 are much different from those of No. 16, No. 10, No. 5, etc.). That is to say, it will be difficult to meet the performance requirements for large-scale production in terms of industrialization, or it will significantly increase production costs (due to poor device consistency, there will be a need for screening or other operations to obtain the required 4*4 interdigital electrode array).

It can be seen from FIG. 7*a* and FIG. 7*b*, the consistency of sensor devices prepared using the film pressing method is noticeably superior to that of sensor devices prepared using the spin coating method.

Furthermore, it should be emphasized that the film pressing method used in the present disclosure differs significantly from the traditional film pressing method. To be precise, the film pressing method of the present disclosure is an improvement upon the traditional method. The main differences are as follows.

Traditional film pressing method typically uses a polymer solution system, which involves dissolving the polymer in a good solvent first. Then, using a template, the solution is pressed flat. Various methods, such as infrared lamp baking or decompression treatment, are used to remove the solvent, resulting in a polymer film. However, the process of removing the intermediate solvent can be time-consuming or involve complex procedures. Additionally, the solvents that evaporate can often be harmful to humans and the environment. When devices are manufactured on a large scale using the traditional film pressing method, the post-treatment and recovery of solvents also entail significant costs.

In contrast, in the present disclosure, after the precursor solution undergoes the improved pressing process, it is photo-cured to undergo a chemical reaction, in-situ forming the ionic gel film. The film pressing method in this invention eliminates the step of dissolving polymer in a good solvent, which means there's no need for the time-consuming and complex solvent evaporation step. This method, therefore, does not produce organic pollutants. As a result, it offers advantages such as simplicity, strong operability, and environmental friendliness.

Example 4

This example is an application scenario of the ionic gel obtained in example 1, which is used in the field of chemical sensing and compares its performance with the chemical sensor based on nanocellulose ionic gel. The steps are as follows:

Step 41 of mixing the 1-vinyl-3-butyl imidazole tetrafluoroborate solution containing the photoinitiator and 1-butyl-3-methyl imidazole tetrafluoroborate in a volume ratio of 2:1 and stirring to obtain a uniform solution, using a micro syringe to draw 5 μL of the above solution onto the interdigital electrode of a glass substrate, of 1 $cm^2$, covering the solution with a PET film, ensuring it is fully spread out, and then curing it under an ultraviolet lamp with a wavelength of 365 nm to obtain Example 1 (the best embodiment of the present disclosure). The interdigital electrode mentioned here can also be a capacitor with 16 sensors.

Step 42 of mixing the 1-vinyl-3-butyl imidazole tetrafluoroborate solution containing the photoinitiator and 1-butyl-3-methyl imidazole tetrafluoroborate in a volume ratio of 10:1 and stirring to obtain a uniform solution, using a micro syringe to draw 5 μL of the above solution onto the interdigital electrode of a glass substrate of 1 $cm^2$, covering the solution with a PET film, ensuring it is fully spread out, and then curing it under an ultraviolet lamp with a wavelength of 365 nm to obtain Example 2.

Step 43 of mixing the 1-vinyl-3-butyl imidazole tetrafluoroborate solution containing the photoinitiator and 1-butyl-3-methyl imidazole tetrafluoroborate in a volume ratio of 20:1 and stirring to obtain a uniform solution, using a micro syringe to draw 5 μL of the above solution onto the interdigital electrode of a glass substrate of 1 cm², covering the solution with a PET film, ensuring it is fully spread out, and then curing it under an ultraviolet lamp with a wavelength of 365 nm to obtain Example 3.

Step 44 of stirring the 1-vinyl-3-butyl imidazole tetrafluoroborate solution containing the photoinitiator to obtain a uniform solution, using a micro syringe to draw 5 μL of the above solution onto the interdigital electrode of a glass substrate of 1 cm², covering the solution with a PET film, ensuring it is fully spread out, and then curing it under a ultraviolet lamp with a wavelength of 365 nm to obtain Example 4.

Step 45 of placing 0.1 g of the nanocellulose-based ionic gel onto the interdigital electrode of a glass substrate of 1 cm², aging it in an oven at 60° C. for 1 hour to remove excess moisture, so as to obtain a contrast example;

Place the aforementioned devices in a custom-made polytetrafluoroethylene (PTFE) chamber. Connect the sensors to the TH2827C type LCR meter via wires. Once the test device is adjusted, close the chamber lid and test the sensor's capacitance signal, treating the capacitance signal as an electrical signal. Once the signal stabilizes, record the changes in the sensor's capacitance characteristics. Subsequently, use a microliter syringe to introduce DMC solvent (a primary component in battery electrolyte) into the chamber. As the DMC evaporates, a vapor of DMC forms in the chamber within a short period. Record the chemical sensor's response to the DMC in the closed chamber.

Figure 8:
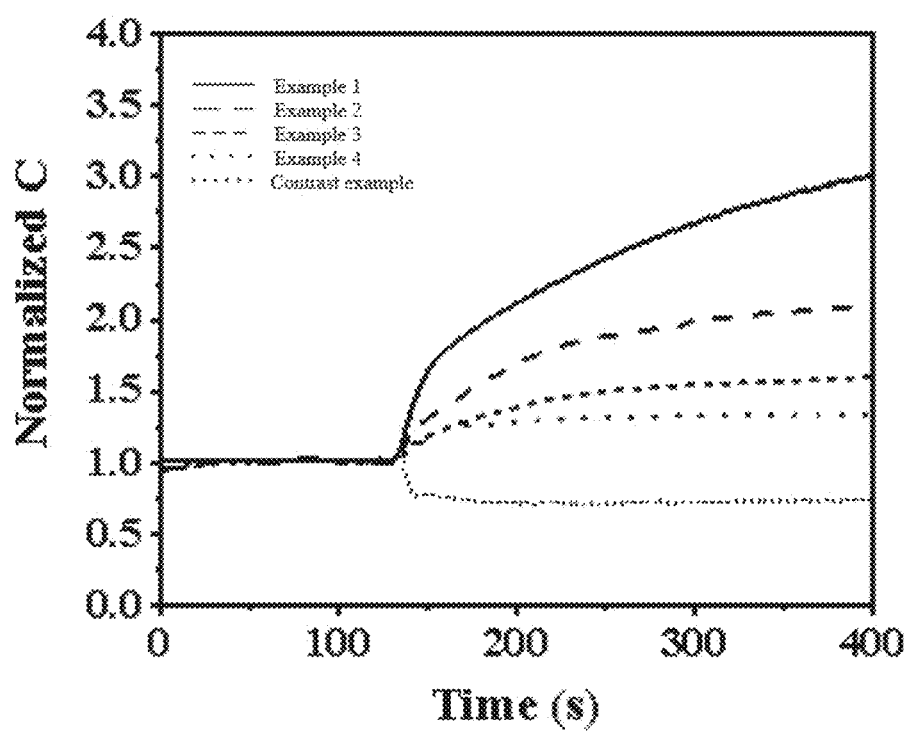
FIG. 8 is a performance comparison of the ionic gel film prepared using the technology described in the third embodiment of this disclosure with other ionic gel films when both are used as chemical sensors.

Referring to FIG. 8, which illustrates the response of the four aforementioned examples and the contrast example to 0.1 mL DMC, based on normalized capacitance. As seen in FIG. 8, when exposed to 0.1 mL DMC, Examples 1-4 all demonstrate a sensitive positive response, while the capacitance of the contrast example shows a negative response. This negative response limits the contrast example's maximum reaction to DMC to only 100%, thereby narrowing the detection range of the analyte and restricting its highly sensitive detection of high-concentration VOC gases. In contrast, the performance of Examples 1 to 4 ensures a wide range, high-resolution detection of the target analyte, highlighting the superiority of the materials prepared in this application in chemical sensing.

Additionally, within Examples 1-4, as the IL content in IL@PIL increases, the device's initial capacitance and its response to DMC also increase correspondingly. This provides theoretical support for designing chemical sensors for various application scenarios. Therefore, this detection method based on the capacitance change of the ionic gel thin film sensor can achieve rapid and effective detection of DMC. Moreover, said sensor exhibits excellent recoverability, allowing for repeated use.

Example 5

This example pertains to an application scenario of the ionic gel derived from the composite ionic liquid and poly(ionic liquid) in Example 1, utilizing it in the field of chemical sensing. Since the chemical sensors based on said ionic gel are also quite sensitive to changes in environmental humidity, humidity compensation is required when using the ionic gel's chemical sensors to detect target gases. This example evaluates the sensing performance of the chemical sensor based on this type of ionic gel after humidity compensation, which includes the following steps:

Step 1 of mixing the 1-vinyl-3-butyl-imidazolium tetrafluoroborate solution containing the photoinitiator with 1-butyl-3-methyl-imidazolium tetrafluoroborate in a volume ratio of 2:1, and stir to form a uniform solution. Using a micro syringe, draw 1 μL of the aforementioned solution onto the interdigital electrodes on a glass substrate of 1 cm², covering the solution with a PET film, ensuring it spreads out entirely, and then curing it under a ultraviolet lamp with a wavelength of 365 nm to obtain the sensor device.

Step 2 of placing the aforementioned device in a custom-made polytetrafluoroethylene (PTFE) chamber, connecting the sensor to the TH2827C type LCR meter using wires, using a micro syringe, inject 10 μL of DMC solvent into the chamber, recording the change in the capacitance characteristics of the sensor to obtain the actual capacitance value of the device during this process.

Step 3 of recording the humidity change during the aforementioned process by a commercial humidity sensor, then using a capacitance-humidity formula to calculate the estimated capacitance value of the device during the process, wherein the capacitance-humidity formula is as follows:

$$C=21.42*T+19.73*H-1057$$

Where: C is the capacitance, T is the temperature, H is the relative humidity.

Figure 9:
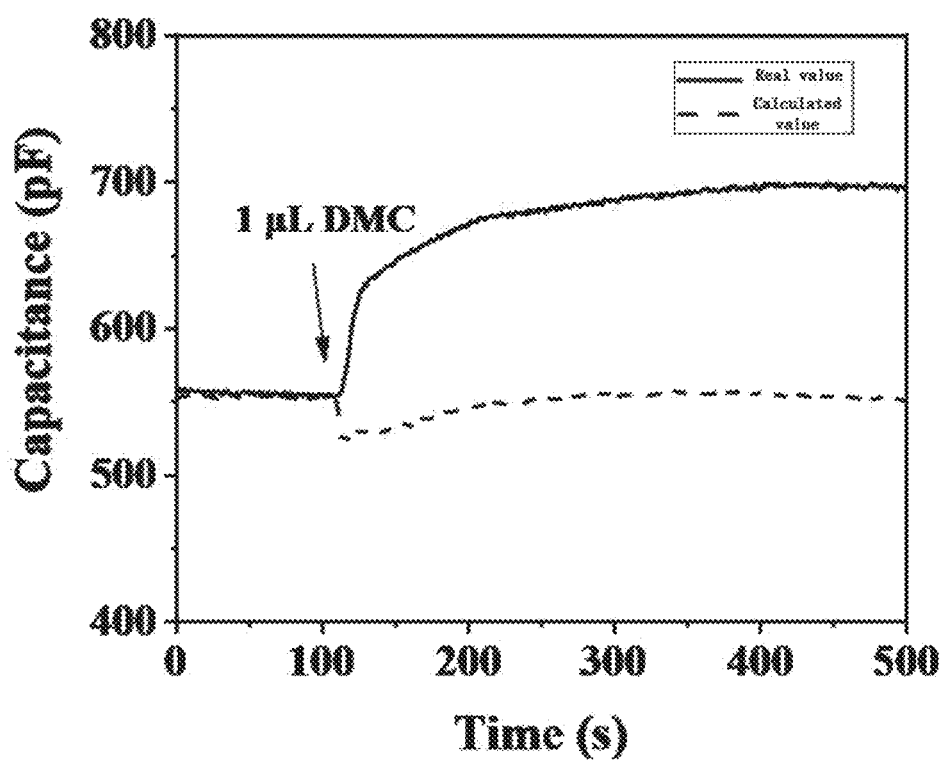
FIG. 9 is an evaluation of the humidity compensation effect on the ionic gel film prepared using the technology described in the third embodiment of this disclosure when used as a chemical sensor.

FIG. 9 shows the real value and calculated value of capacitance of the device during the described process. As seen in FIG. 6, the real and calculated values closely align at the initial stages, indicating that the capacitance-humidity formula provides a reliable humidity compensation for the device. Upon exposure to 10 μL of DMC, the real capacitance value swiftly rises (sharply increasing to near the real value between 100 s to 150 s), while the calculated value, primarily influenced by humidity changes, first decreases and then gradually returns to its initial state. This suggests that the difference between the real and calculated values allows for precise quantitative analysis of DMC. This phenomenon demonstrates that by compensating for humidity, the device can effectively circumvent interference caused by humidity changes, ensuring rapid and efficient detection of the target analyte.

Example 6

This example pertains to an application scenario of the ionic gel derived from the composite ionic liquid and poly(ionic liquid) presented in Example 1, utilizing it in the domain of chemical sensing. In recent years, the safety issues surrounding lithium-ion batteries have garnered extensive attention from various sectors of society. Monitoring the leakage of electrolytes in lithium-ion batteries is considered a vital measure in ensuring the safety of these batteries.

The chemical sensor based on the ionic gel film exhibits a sensitive response to main solvent of lithium-ion battery electrolytes, the main solvent comprises ester solvent and ether solvent. In lithium-ion battery electrolyte, common ester solvent includes: ethylene carbonate, dimethyl carbonate and propylene carbonate, common ether solvent includes: dimethoxyethane and diethylene glycol dimethyl ether. The output signal form of the chemical sensor based on the ionic gel film includes but is not limited to capacitance, resistance, impedance, current, etc.

The aforementioned examples primarily focused on detecting a major component, DMC, in the battery electrolyte. This example evaluates the sensing performance of the chemical sensor based on said ionic gel for a range of real electrolyte volumes, comprising the following steps:

Step 1 of mixing a of 1-vinyl-3-butyl imidazolium tetrafluoroborate solution containing a photoinitiator and 1-butyl-3-methylimidazolium tetrafluoroborate in a volume ratio of 4:1 and stirring to obtain a homogeneous solution, using a micro-syringe to apply 0.5 μL of the above solution to interdigital electrodes of a glass substrate of 1 $cm^2$, covering a PET film over the solution, ensuring it is fully spread out, and then photocuring under a ultraviolet lamp with a wavelength of 365 nm to obtain a sensor device;

Step 2 of placing the sensor device into a custom-made polytetrafluoroethylene chamber, connecting the sensor to a TH2827C type LCR meter by wires, injecting electrolyte with a series of volumes into the chamber with a micro-syringe, and recording the capacitive characteristic changes of the sensor device throughout the process.

Figure 10:
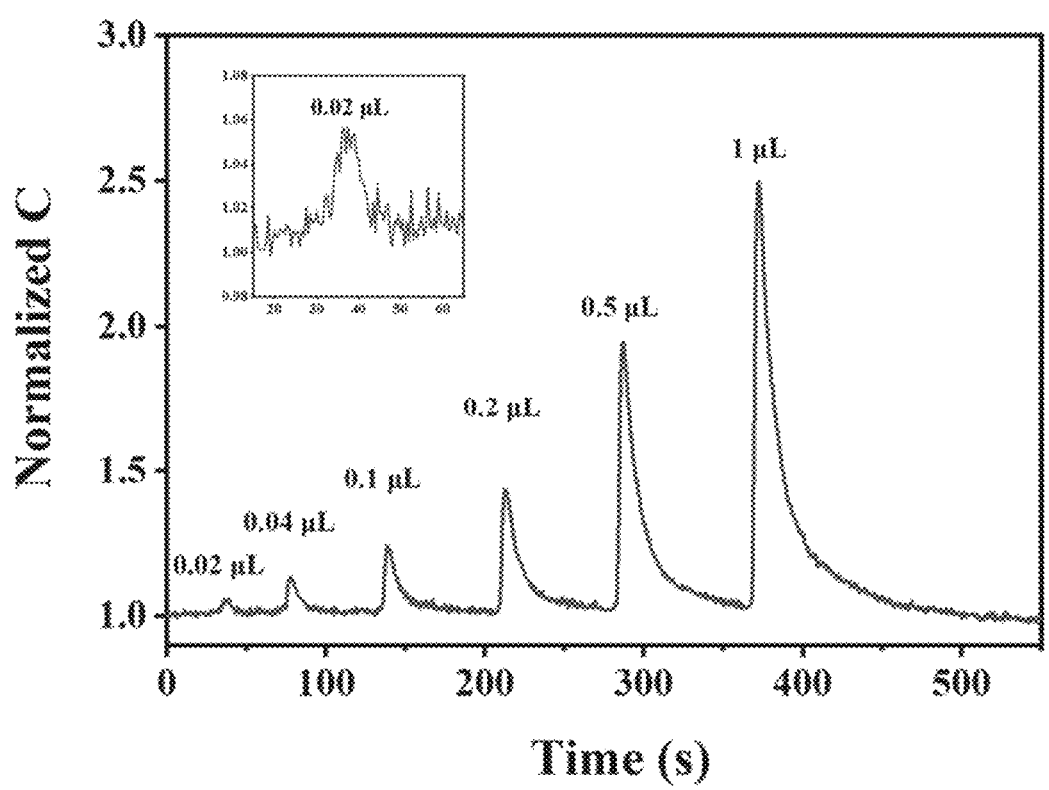
FIG. 10 is an evaluation of the response effect on the actual electrolyte when the ionic gel film prepared using the technology described in the sixth example of the third embodiment of the disclosure is used as a chemical sensor.

Referring to FIG. 10, in this experiment, the sensor detects lithium battery electrolyte with leakages of 0.02, 0.04, 0.1, 0.2, 0.5, and 1 μL respectively. When the lithium-ion battery electrolyte is injected, a high concentration of evaporated electrolyte gas is formed within the chamber, leading to a rapid increase in the sensor's capacitance. As the concentration of the electrolyte in the chamber diminishes, the device's capacitance correspondingly decreases until it returns to its initial value.

Referring to FIG. 10, it is evident that with the leakage volumes of 0.02, 0.04, 0.1, 0.2, 0.5, and 1 μL of lithium battery electrolyte, the sensor's capacitance increased by 5.7%, 13.5%, 23.9%, 43.5%, 94.7%, and 149.6%, respectively. Once the concentration of the electrolyte decreased, the capacitance subsequently returned to its initial values. Furthermore, the sensor exhibits high sensitivity, being able to detect even at a volume of 0.02 μL.

Therefore, based on the capacitive change characteristics of the ionic gel film sensor comprised of the composite ionic liquid and poly(ionic liquid), rapid and effective detection of lithium-ion battery electrolytes can be achieved. The sensor is capable of identifying various leakage volumes of lithium battery electrolytes. Additionally, it possesses excellent recoverability, allowing for repeated use, and can facilitate real-time static and dynamic monitoring of the health status of lithium batteries The preparation method of an ionic gel film proposed in the present disclosure involves taking a predetermined amount of the homogeneous solution and dropping it onto a first substrate; using a second substrate to flatten the homogeneous solution on the first substrate; curing with ultraviolet light of a preset wavelength on the flattened homogeneous solution on the first substrate; curing until the vinyl-containing ionic liquid undergoes in-situ polymerization to form an ionic gel; removing the second substrate after curing by ultraviolet light, so as to obtain an ionic gel film on the first substrate. This preparation method is characterized by its simplicity, short processing time, and other advantages, making it suitable for large-scale industrial production.

In addition, the ionic gel described in Example 1, the ionic gel preparation method in Example 2, and the preparation method of ionic gel film in Example 3, the present disclosure also elucidates the application of the ionic gel film. The ionic gel film of the present disclosure is primarily employed in areas such as gas sensing, solid-state electrolytes, flexible electrodes, and solar cells. For instance, when using the aforementioned ionic gel film for flexible electrodes, the ionic gel film is predominantly adopted as the anode or cathode of the flexible electrode. The polarity can be determined based on the polarity of the ions. Typically, the thickness of the flexible electrode is around 75 nm, and the spacing between adjacent electrodes can be about 100 μm. This broadens its range of potential applications significantly.

The ionic gel film prepared by the preparation method described in the present disclosure has a wide range of application scenarios in various fields. For example, in chemical sensing, metal oxide semiconductor sensors, which are the most widely used, rely on electrons or holes as carriers. As a result, their sensing mechanism is singular, and their detection range is somewhat limited, making it difficult to detect low-polarity, redox-neutral substances. By using the ionic gel composed of a composite ionic liquid and a poly(ionic liquid) as the sensing material, organic ions serve as the carriers. These carriers are diverse and tunable, leading to not only rapid response times but also enhanced selectivity towards target analytes by selecting specific organic ions.

In the present disclosure, such an ionic gel, made from a combination of ionic liquid and poly(ionic liquid), is used as the sensing material to fabricate chemical sensors for monitoring trace electrolyte leakage. The device demonstrates excellent sensitivity, rapid response time, and outstanding consistency. Thus, chemical sensors based on this type of ionic gel hold significant commercial potential.

It should be noted that the above embodiments and examples are provided only for the purpose of illustrating the technical solutions of the present disclosure and not intended to be limiting. While the present disclosure has been described in detail with reference to the aforementioned embodiments and examples, those skilled in the art should understand that they can still make modifications to the technical solutions recorded in the aforementioned embodiments and examples, or equivalently replace some or all of the technical features. Such modifications or replacements do not depart from the essence of the technical solutions of the embodiments and examples of the present disclosure.

What is claimed is:

1. A preparation method of an ionic gel film, wherein the ionic gel comprises a poly(ionic liquid) and a vinyl-free ionic liquid monomer, the ionic gel is formed by compounding the vinyl-free ionic liquid monomer with the poly(ionic liquid), the poly(ionic liquid) is formed through the polymerization of ionic liquid monomers containing C=C double bonds to form a skeleton, while the vinyl-free ionic liquid monomer exists in a free state within the poly(ionic liquid), the preparation method comprises:

blending a vinyl-free ionic liquid with a vinyl-containing ionic liquid and a specified additive to obtain a homogenous solution, wherein the concentration of the vinyl-free ionic liquid is less than or equal to the concentration of the vinyl-containing ionic liquid, the additive is at least one of photoinitiators, crosslinkers, and plasticizers, taking a predetermined amount of the homogenous solution and dropping it onto a first substrate equipped with interdigital electrodes, flattening the homogenous solution on the first substrate using a second substrate, curing the flattened homogenous solution on the first substrate using ultraviolet light of a preset wavelength, and, curing until the vinyl-containing ionic liquid polymerizes in situ to form an ionic gel film.

2. The preparation method of the ionic gel film according to claim 1, wherein the preparation method further comprises:
evaluating the electrical conductivity of the ionic gel film.

3. The preparation method of the ionic gel film according to claim 1, wherein the preset wavelength of the ultraviolet light ranges from 10 nm to 400 nm.

4. The preparation method of the ionic gel film according to claim 1, wherein the second substrate is a transparent substrate.

5. The preparation method of the ionic gel film according to claim 1, wherein an anion of the vinyl-free ionic liquid is one of tetrafluoroborate, hexafluorophosphate, bis(trifluoromethane)sulfonimide, and halide ions.

6. The preparation method of the ionic gel film according to claim 1, wherein the poly(ionic liquid) is obtained by polymerizing a vinyl-containing imidazole-based ionic liquid monomer.

7. The preparation method of the ionic gel film according to claim 6, wherein a substituent on the imidazole ring of the vinyl-containing imidazole-based ionic liquid monomer is an alkyl substituent.

8. The preparation method of the ionic gel film according to claim 7, wherein the vinyl-containing imidazole-based ionic liquid monomer is selected from at least one of 1-vinyl-3-methylimidazolium chloride, 1-vinyl-3-butylimidazolium tetrafluoroborate, 1-vinyl-3-methylimidazolium hexafluorophosphate, 1-vinyl-3-benzylimidazolium methanesulfonate, 1-allyl-3-methylimidazolium chloride, 1-allyl-3-methylimidazolium tosylate, and 1-allyl-3-butylimidazolium hexafluorophosphate.

9. The preparation method of the ionic gel film according to claim 1, wherein curing time of the ultraviolet light during ionic gel film formation ranges from 1 sec to 30 min.

10. The preparation method of the ionic gel film according to claim 1, wherein the thickness of the ionic gel film ranges from 10 nm to 500 μm.

11. A preparation method of a chemical sensor, wherein the preparation method of the chemical sensor comprises:
preparing an ionic gel film according to the preparation method of the ionic gel film according to claim 1, and, depositing the ionic gel film on an interdigital electrode of a first substrate for a preset duration to obtain a chemical sensor.

12. The preparation method of the chemical sensor according to claim 11, wherein the preparation method of the chemical sensor further comprises:
performing a capacitance test on the prepared chemical sensor to evaluate the consistency of the chemical sensor.

13. The preparation method of the chemical sensor according to claim 11, wherein the preparation method of the chemical sensor further comprises:
testing a capacitance change characteristic and recoverability of the ionic gel film to DMC the chemical sensor is used for monitoring the leakage of electrolytes in lithium-ion batteries.

14. The preparation method of the chemical sensor according to claim 11, wherein the present duration is based on the mass ratio of the specified additive to the vinyl-containing ionic liquid.

15. The preparation method of the chemical sensor according to claim 11, wherein the preparation method of the chemical sensor further comprises:
performing humidity compensation on the chemical sensor to enhance sensing performance thereof.

16. The preparation method of the chemical sensor according to claim 15, wherein the step of performing humidity compensation on the chemical sensor to enhance sensing performance thereof comprises:
acquiring capacitance characteristic changes of the chemical sensor to obtain a real value of capacitance of the chemical sensor during the process of detecting a target gas,
recording humidity changes during the target gas detection process using a humidity sensor, and calculating to obtain a calculated value of capacitance of the chemical sensor during this process using a capacitance-humidity formula,
comparing the real value with the calculated value to achieve quantitative analysis of DMC.

* * * * *